(12) United States Patent
Li et al.

(10) Patent No.: US 7,440,701 B2
(45) Date of Patent: Oct. 21, 2008

(54) FIBER-TO-THE-PREMISE OPTICAL COMMUNICATION SYSTEM

(75) Inventors: Wen Li, Fremont, CA (US); Qing Zhu, San Jose, CA (US)

(73) Assignee: Broadway Networks, Ltd., San Jose, CA (US)

( * ) Notice: Subject to any disclaimer, the term of this patent is extended or adjusted under 35 U.S.C. 154(b) by 345 days.

(21) Appl. No.: 11/396,973

(22) Filed: Apr. 3, 2006

(65) Prior Publication Data

US 2007/0140693 A1 Jun. 21, 2007

Related U.S. Application Data

(60) Provisional application No. 60/750,026, filed on Dec. 13, 2005.

(51) Int. Cl.
*H04B 10/00* (2006.01)
(52) U.S. Cl. .............................. 398/135; 398/67; 398/82
(58) Field of Classification Search ............. 398/67–72, 398/82–89, 135
See application file for complete search history.

(56) References Cited

U.S. PATENT DOCUMENTS

| | | | |
|---|---|---|---|
| 5,680,234 A | 10/1997 | Darcie | |
| 5,694,234 A | 12/1997 | Darcie | |
| 5,864,413 A | 1/1999 | Feldman | |
| 5,907,417 A | 5/1999 | Darcie | |
| 6,151,144 A | 11/2000 | Knox | |
| 6,304,350 B1 | 10/2001 | Doerr | |
| 6,381,047 B1 | 4/2002 | Frigo | |
| 6,411,410 B1 | 6/2002 | Wright | |
| 6,721,506 B1 | 4/2004 | Lam | |
| 2002/0039214 A1 | 4/2002 | Ruan | |
| 2002/0067525 A1* | 6/2002 | Sakamoto et al. | 359/124 |
| 2002/0186439 A1 | 12/2002 | Buabbud | |
| 2003/0180049 A1 | 9/2003 | Park | |
| 2004/0033076 A1* | 2/2004 | Song et al. | 398/70 |
| 2004/0091265 A1 | 5/2004 | Kim | |
| 2005/0041971 A1* | 2/2005 | Lee et al. | 398/72 |
| 2006/0082866 A1* | 4/2006 | Takahashi et al. | 359/334 |
| 2006/0109875 A1* | 5/2006 | Matsushita et al. | 372/29.02 |

* cited by examiner

*Primary Examiner*—Dzung D Tran
(74) *Attorney, Agent, or Firm*—Xin Wen (57) ABSTRACT

An optical communication system includes a first wavelength filter, a bidirectional amplifier, and a second wavelength filter. The first wavelength filter can receive a downstream broad-spectrum signal and output a downstream spectrum-sliced signal in response to the downstream broad-spectrum signal. The bidirectional amplifier can amplify the downstream spectrum-sliced signal. The second wavelength filter can receive the amplified downstream spectrum-sliced signal from the bidirectional amplifier and route the amplified downstream spectrum-sliced signal. The second wavelength filter can also output an upstream spectrum-sliced signal in response to an upstream broad-spectrum signal. The bidirectional amplifier can amplify the upstream spectrum-sliced signal to product an amplified upstream spectrum-sliced signal that is subsequently routed by the first wavelength filter.

26 Claims, 9 Drawing Sheets

FIBER-TO-THE-PREMISE OPTICAL COMMUNICATION SYSTEM

CROSS-REFERENCES TO RELATED INVENTIONS

The present application claims priority to the commonly assigned U.S. Provisional Patent Application No. 60/750,026, filed on Dec. 13, 2005, titled "Bidirectional spectrally-sliced WDM-PON access system and method" by Li and Zhu. The disclosures of this related application are incorporated herein by reference.

BACKGROUND

The present disclosure relates to optical communication technologies.

As the Internet, voice over Internet Protocol (VoIP), and Internet Protocol television (IPTV) grow in popularity, more and more users desire to have accesses to these services from their premises. The most common local network accesses to these services are the digital subscriber line (DSL) and the cable modem. The DSL and cable networks respectively operate on a pair of copper wires or coaxial cable. While the DSL and the cable modem allow data transfer at up to several million bits per second downstream to a user, the upstream data transfer is usually at lower transfer rate.

Passive optical network (PON) is attractive network architecture for the last-mile access because it does not require active components for directing optical signals between a central office and the network subscribers' terminal equipment. The PON can be divided into three main categories: time division multiplexing (TDM), wavelength division multiplexing (WDM), and a combination of TDM and WDM.

Fiber to the premises (FTTP) is a desirable architecture for providing access from the user's premises. FTTP takes optical fibers all the way into the user's home or premises. Currently, time-division-multiplexing passive optical networks (TDM-PON) are the primary deployment methods for FTTP. TDM-PON is a point-to-multipoint architecture utilizing an optical power splitter at a remote node. TDM-PON delivers downstream information through broadcasting and bandwidth sharing, and receives upstream information via time division multiple access (TDMA). One drawback with TDM-PON is associated with the low security of the broadcasted downstream signals. The complexity of the TDMA protocols also makes TDM-PON undesirable for the next generation user-centric high-speed, broadband services.

Figure 1:
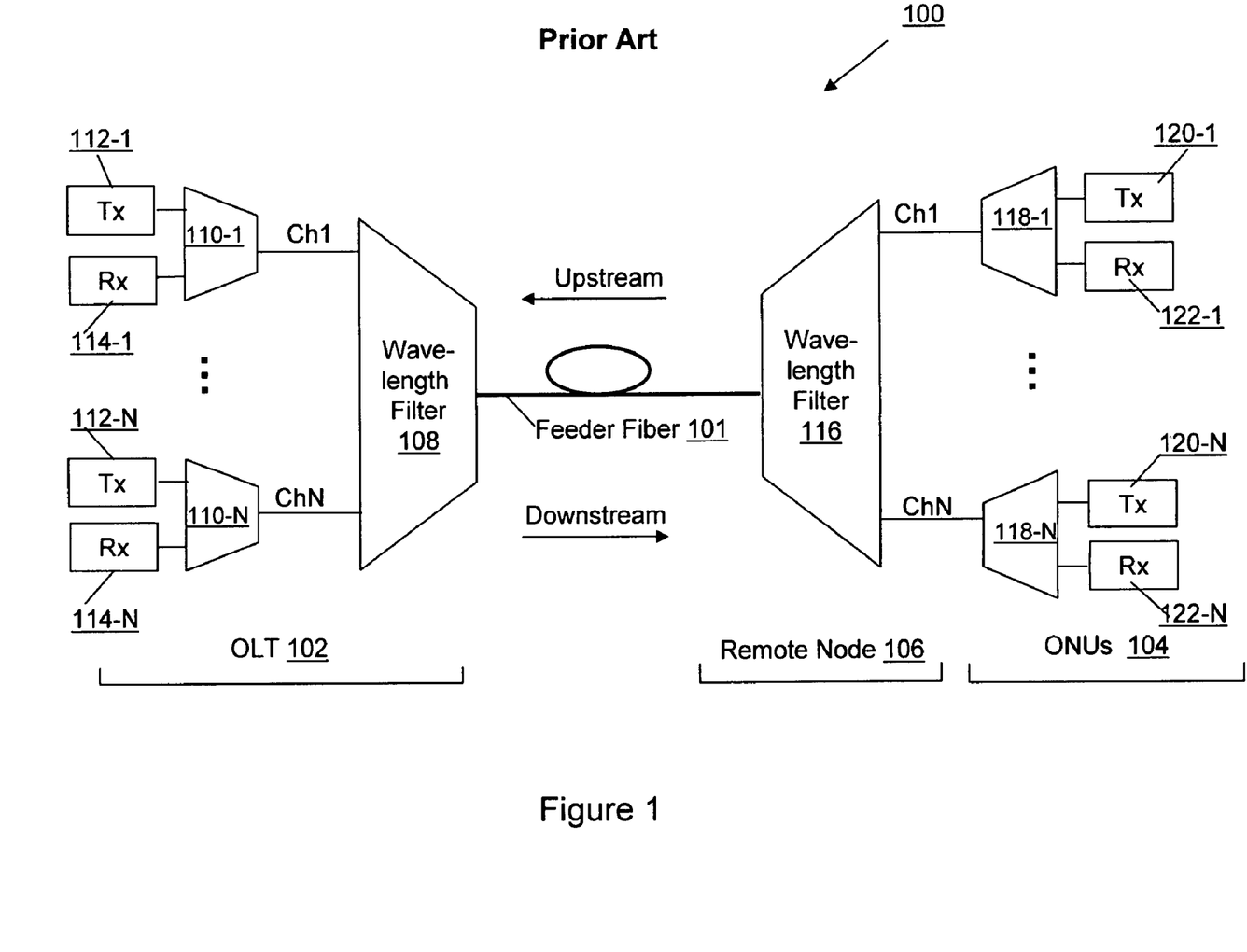
FIG. 1 is a block diagram of a conventional WDM-based optical network.

A recent development in the FTTPs is PON based on wavelength division multiplexing (WDM) technology. FIG. 1 illustrates a conventional WDM-based optical network 100 that includes a pair of WDM filters 108 and 116 for multiplexing and de-multiplexing between an optical line terminal (OLT) 102 and an optical network unit (ONU) 104. The optical line terminal (OLT) 102 can be coupled to a plurality of optical network units (ONUs) 104 via a remote node 106. Each subscriber at an ONU 104 is assigned a separate WDM channel, whereby the channels are routed by a passive WDM filter 116 at the remote node 106. The OLT 102 includes a WDM filter 108 coupled to a plurality of band separators 110-1, 110-2 . . . and 110-N. Each band separator 110-1, 110-2 . . . or 110-N is further coupled to a transmitter 112-1, 112-2 . . . or 112-N and a receiver 114-1, 114-2 . . . or 114-N. The transmitters 112-1 . . . 112-N at the OLT 102 are narrow-spectrum light source providing the downstream signals.

The remote node 106 includes a passive WDM filter 116. The passive WDM filter 116 provides a plurality of channels that each channel terminates at one of the ONU 104. Each ONU 104 includes a band separator 118-1, 118-2 . . . or 118-N each coupled to a transmitter 120-1, 120-2 . . . or 120-N and a receiver 122-1, 122-2 . . . or 122-N. The transmitters 120-1, 120-2 . . . and 120-N at the ONUs 104 are narrow-spectrum light sources for providing upstream signals. The transmitters 120-1 . . . 120-N and 112-1 . . . 112-N can be provided by narrow-spectrum laser diodes with various wavelength tuning and stabilization mechanisms.

A disadvantage of the above described conventional WDM-based optical network is associated with the high costs of the wavelength-controlled narrow-spectrum light sources such as distributed-feedback (DFB) laser diodes. The ONU for each subscriber uses at least one such laser. A large number of the wavelength-controlled narrow-spectrum light sources are thus required in the conventional WDM-based optical network 100. Furthermore, the wavelength-controlled narrow-spectrum laser diode at each ONU has a specific center wavelength (CW) that needs to be stabilized by a temperature control device. It is costly to install and difficult to maintain the wavelength-specific, precision-controlled narrow-spectrum light sources at the large number of ONUs.

SUMMARY

In a general aspect, the present invention relates to an optical communication system, including: a) a first wavelength filter, comprising: a plurality of first branching ports each associated with a specific wavelength channel, wherein each of the first branching ports is in connection with a transceiver port and is configured to receive a downstream broad-spectrum signal from the transceiver port; and a first common port configured to output a downstream spectrum-sliced signal in response to the downstream broad-spectrum signal, wherein the spectrum of the downstream spectrum-sliced signal is a portion of the spectrum of the downstream broad-spectrum signal and the spectrum of the downstream spectrum-sliced signal is distributed in a wavelength channel specifically associated with the first branching port at which the downstream broad-spectrum signal is received; b) a bidirectional amplifier configured to receive the downstream spectrum-sliced signal from the first common port and to send an amplified downstream spectrum-sliced signal to a remote node, wherein the bidirectional amplifier is configured to receive an upstream spectrum-sliced signal from the remote node and to send an amplified upstream spectrum-sliced signal to the first common port of the first wavelength filter, and wherein the first wavelength filter is configured to route the amplified upstream spectrum-sliced signal to one of the first branching ports in accordance with the wavelength channel of the amplified upstream spectrum-sliced signal; and c) a plurality of transceiver ports each comprising: a first transmitter configured to produce the downstream broad-spectrum signal to be received by the first branching port in connection with the transceiver port; and a first receiver configured to receive the amplified upstream spectrum-sliced signal from the first branching port.

In yet another general aspect, the present invention relates to an optical communication system including: a) a first wavelength filter, comprising: a plurality of first branching ports each associated with a specific wavelength channel, wherein each of the first branching ports is configured to receive a downstream broad-spectrum signal; and a first common port configured to output a downstream spectrum-sliced signal in response to the downstream broad-spectrum signal, wherein the spectrum of the downstream spectrum-sliced signal is a portion of the spectrum of the downstream broad-spectrum signal and the spectrum of the downstream spectrum-sliced signal is distributed in a wavelength channel specifically associated with the first branching port at which the downstream broad-spectrum signal is received; b) a bidirectional amplifier configured to receive the downstream spectrum-sliced signal from the first common port and to send an amplified downstream spectrum-sliced signal to a second wavelength filter, wherein the bidirectional amplifier is configured to receive an upstream spectrum-sliced signal from the second wavelength filter and to send an amplified upstream spectrum-sliced signal to the first common port, and wherein the first wavelength filter is configured to route the amplified upstream spectrum-sliced signal to one of the first branching ports in accordance with the wavelength channel of the amplified upstream spectrum-sliced signal; and c) a second wavelength filter, comprising: a plurality of second branching ports each associated with a specific wavelength channel, wherein each of the second branching ports is configured to receive an upstream broad-spectrum signal; and a second common port configured to output the upstream spectrum-sliced signal in response to the upstream broad-spectrum signal, wherein the spectrum of the upstream spectrum-sliced signal is a portion of the spectrum of the upstream broad-spectrum signal and the spectrum of the upstream spectrum-sliced signal is distributed in a wavelength channel specifically associated with the second branching port at which the upstream broad-spectrum signal is received, and wherein the second wavelength filter is configured to receive the amplified downstream spectrum-sliced signal from the bidirectional amplifier at the second common port and to route the amplified downstream spectrum-sliced signal to one of the second branching ports that is specifically associated with the wavelength channel of the downstream spectrum-sliced signal.

In yet another general aspect, the present invention relates to an optical communication system, including: a) a plurality of first wavelength filters, each comprising: a plurality of first branching ports each associated with a specific wavelength channel, wherein each of the first branching ports is configured to receive a downstream broad-spectrum signal; and a first common port configured to output a downstream spectrum-sliced signal in response to the downstream broad-spectrum signal, wherein the spectrum of the downstream spectrum-sliced signal is a portion of the spectrum of the downstream broad-spectrum signal and the spectrum of the downstream spectrum-sliced signal is distributed in a wavelength channel specifically associated with the first branching port at which the downstream broad-spectrum signal is received; b) a plurality of bidirectional amplifiers in connect with one of the first wavelength filters and one of the second wavelength filters, wherein each of bidirectional amplifier is configured to receive the downstream spectrum-sliced signal from the first common port and to send an amplified downstream spectrum-sliced signal to a second wavelength filter, wherein the bidirectional amplifier is configured to receive an upstream spectrum-sliced signal from the second wavelength filter and to send an amplified upstream spectrum-sliced signal to the first common port, and wherein the first wavelength filter is configured to route the amplified upstream spectrum-sliced signal to one of the first branching ports in accordance with the wavelength channel of the amplified upstream spectrum-sliced signal; c) a pump source configured to energize the plurality of bidirectional amplifiers; and d) a plurality of second wavelength filters, each comprising: a plurality of second branching ports each associated with a specific wavelength channel, wherein each of the second branching ports is configured to receive an upstream broad-spectrum signal; and a second common port configured to output the upstream spectrum-sliced signal in response to the upstream broad-spectrum signal, wherein the spectrum of the upstream spectrum-sliced signal is a portion of the spectrum of the upstream broad-spectrum signal and the spectrum of the upstream spectrum-sliced signal is distributed in a wavelength channel specifically associated with the second branching port at which the upstream broad-spectrum signal is received, and wherein the second wavelength filter is configured to receive the amplified downstream spectrum-sliced signal from the bidirectional amplifier at the second common port and to route the amplified downstream spectrum-sliced signal to one of the second branching ports that is specifically associated with the wavelength channel of the downstream spectrum-sliced signal.

Implementations of the system may include one or more of the following. At least one of the transceiver ports can include a first signal separating/combining device configured to receive the downstream broad-spectrum signal from the first transmitter and to send the downstream broad-spectrum signal to the associated branching port in the first wavelength filter, and configured to receive the amplified upstream spectrum-sliced signal from the associated branching port in the wavelength filter and to send the amplified upstream spectrum-sliced signal to the first receiver. The spectral full-width at half the maximum of the downstream broad-spectrum signal can be broader than 1 nanometer. The first wavelength filter can include an arrayed-waveguide grating configured to filter the downstream broad-spectrum signal received at one of the first branching ports and to pass the downstream spectrum-sliced signal to the first common port. The first wavelength filter can be configured to route the amplified upstream spectrum-sliced signal received at the first common port to one of the first branching ports such that the wavelength channel of the amplified upstream spectrum-sliced signal matches the specific wavelength channel associated with the first branching port that receives the amplified upstream spectrum-sliced signal. The bidirectional amplifier can include only passive components and is energized by an external pump source. The first wavelength filter and the bidirectional amplifier can be co-located at an optical line terminal. The remote node can include a second wavelength filter that includes a plurality of second branching ports each associated with a specific wavelength channel, wherein each of the second branching ports is configured to receive an upstream broad-spectrum signal from an optical network unit; and a second common port configured to output the upstream spectrum-sliced signal in response to the upstream broad-spectrum signal, wherein the spectrum of the upstream spectrum-sliced signal is a portion of the spectrum of the upstream broad-spectrum signal and the spectrum of the upstream spectrum-sliced signal is distributed in a wavelength channel specifically associated with the second branching port at which the upstream broad-spectrum signal is received. The second wavelength filter can receive the amplified downstream spectrum-sliced signal from the bidirectional amplifier at the second common port and to route the amplified downstream spectrum-sliced signal to the optical network unit that is specifically associated with the wavelength channel of the downstream spectrum-sliced signal. The optical network unit can include a second receiver configured to receive the amplified downstream spectrum-sliced signal from the second common port and a second transmitter configured to produce the upstream broad-spectrum signal to be sent to the second branching port in connection with the optical network unit. The spectral full-width at half the maximum of the upstream broad-spectrum signal is broader than 1 nanometer.

Embodiments may include one or more of the following advantages. The disclosed optical communication system provides an efficient and cost-effective optical communication system. The disclosed optical communication system includes only passive devices between the central office and the user's premises, which significantly reduces system costs and maintenance comparing to some conventional systems that use active devices in the field. For example, passive arrayed waveguide gratings (AWGs) or thin-film filters (TFTs) can be implemented as the wavelength multiplexing and routing devices in the disclosed optical communication system. The use of passive devices in the fields also improves the system reliability of the optical communication system.

The disclosed communication system can reduce system complexity and costs by using stable broad-spectrum sources such as light emitting diodes (LED) and/or laser diodes for both downstream and upstream transmissions. The broad-spectrum transmitters can be self-adaptive in signal transmission without the costly temperature control to stabilize the center wavelength. The disclosed communication system can provide amplifications downstream or upstream signal or both signals within an optical line terminal (OLT) at a central office. Furthermore, the optical amplifiers in multiple OLTs in the disclose communication system can share a pump laser source.

Another advantage of the disclosed optical communication system is that it provides flexibility for network configuration, integration, and management. The disclosed optical communication system is agnostic to different communication protocols. Unlike conventional TDM-PON systems that need extra protocols (TDMA, RANGING) between optical layer and data layer, the signal transmission between the OLT and ONU in the disclosed optical communication system operates in a continuous mode and each ONU occupies a dedicated channel. The system can naturally adapt to any communication protocols at any bit-rate.

Yet another advantage of the disclosed optical communication system is that the ONUs can each communicate in independent channels. The bandwidth capacity for each ONU can be upgraded without changing the overall optical communication system and at minimal incremental cost. In contrast, the downstream and upstream bandwidths are shared by all users in a conventional PON (or TDM-PON) system. Any bandwidth increase with one user will affect the resource allocation and the system operation of the entire system. The conventional PON (or TDM-PON) is thus not scalable and extremely bit-rate and protocol dependent. Thus the disclosed optical communication system can provide much improved bandwidth scalability, upgrade flexibility and performance robustness.

The disclosed optical communication system includes a number of other advantages. The disclosed optical communication system can provide symmetrical bandwidths for downstream and upstream signals. The bandwidth symmetry allows high bit-rate data transfers both downstream and upstream directions, which is a significant improvement over TDM-PONs (APON, BPON, EPON and GPON) and the conventional systems based on DSL and cable modems. The disclosed optical communication system also provides excellent network security because each ONU occupies a distinct wavelength channel and is physically isolated from other wavelength channels at optical layer.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

DETAILED DESCRIPTION

Figure 2A:
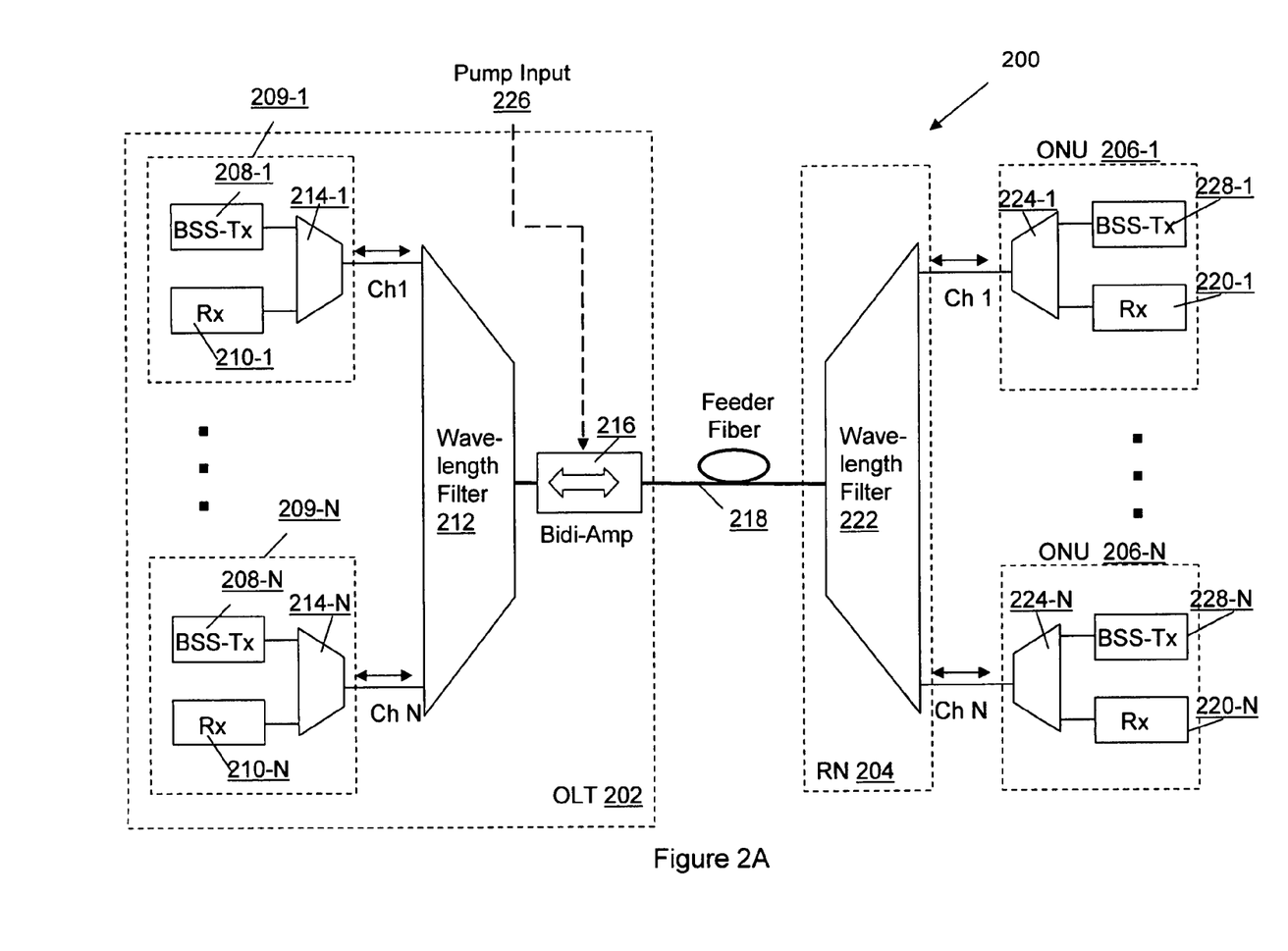
FIG. 2A is a block diagram of an optical communication system in accordance to an embodiment of the present specification.

FIG. 2A shows an optical communication system 200 in accordance with an embodiment of the present invention. The optical communication system 200 includes an OLT 202, a remote node (RN) 204 in connection with the OLT 202 through an optical network, and a plurality of ONUs 206-1, 206-2 . . . and 206-N in connection with the RN 204.

The optical communication system 200 includes two symmetric wavelength filters: a wavelength filter 212 in the OLT 202 and a wavelength filter 222 at the RN 204. The wavelength filter 212 and the wavelength filter 222 are wavelength division multiplexing (WDM) filters. The wavelength filters 212 and 222 can be implemented by arrayed-waveguide gratings (AWG) that can be tuned to the common communication bands, including O, E, S, C, L or U-band and typically follow the wavelength grids of International Telecommunication Union (ITU). The wavelength filters 212 or 222 can also be based on other forms of WDM filters such as thin-film DWDM and CWDM filters.

Figure 2B:
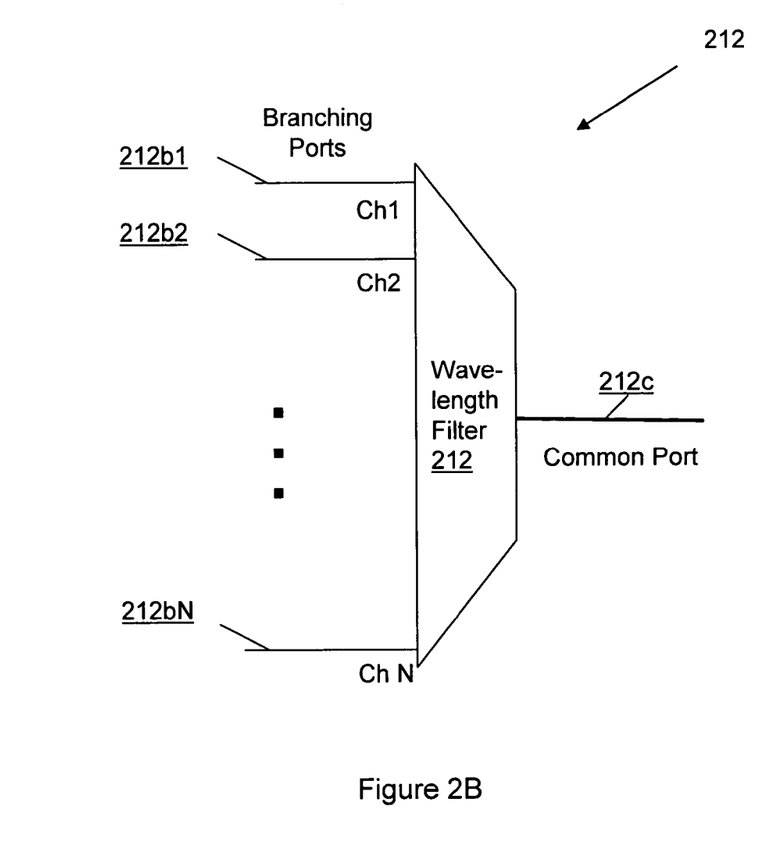
FIG. 2B is a detailed view of the wavelength filter in the optical line terminal in the optical communication system of FIG. 2A.
Figure 2C:
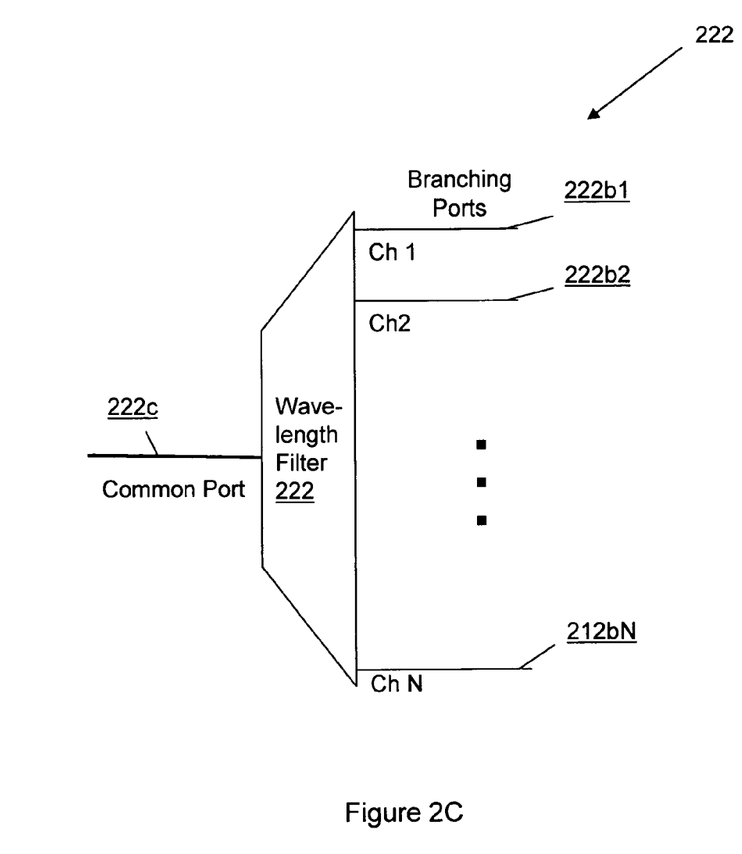
FIG. 2C is a detailed view of the wavelength filter in the remote node in the optical communication system of FIG. 2A.

The wavelength filter 212 or 222 can receive broad-spectrum signals at separate branching ports (i.e. 212b1, 212b2 . . . 212bN and 222b1, 222b2 . . . 222bN as shown in FIGS. 2B and 2C) as inputs and filter (or slice) the broad-spectrum signals to output multiplexed spectrum-sliced signals at the common ports (i.e. 212c, and 222c in FIGS. 2B and 2C) of the wavelength filter 212 or 222. Each of the spectrum-sliced signals carries data from the respective input broad-spectrum signals. The output spectrum-sliced signals are distributed in a plurality of predetermined wavelength channels "Ch1", "Ch2" . . . "Ch N" identical to both wavelength filters 212 and 222. The wavelength channels "Ch1", "Ch2" . . . "Ch N" are determined by the pass bands of the wavelength filters 212 and 222, and are characterized by the unique channel center wavelengths ($\lambda_{Ch1}, \lambda_{Ch2} \ldots \lambda_{ChN}$), pass band width and optical isolation between each wavelength channel. The adjacent channel spacing ($|\lambda_{Chi}-\lambda_{Chi-1}|$, i=2,3 . . . N) between the wavelength channels "Ch1", "Ch2" . . . "Ch N" of the filters 212 or 222 can range from a few tens to a few thousands of gigahertz.

A detailed view of the wavelength filter 212 in the OLT 202 is shown in FIG. 2B. The wavelength filter 212 includes a plurality of branching ports 212b1, 212b2 . . . and 212bN, and a common port 212c. Each of the branching ports 212b1, 212b2 . . . or 212bN is associated with a distinct and specific wavelength channel "Ch1", "Ch2" . . . or "Ch N". The wavelength filter 212 can receive a downstream broad-spectrum signal at a branching ports 212b1, 212b2 . . . or 212bN, and filter (or slice) the spectrum of the downstream broad-spectrum signal. The wavelength filter 212 then outputs a downstream spectrum-sliced signal at the common port 212c. The spectrum of the downstream spectrum-sliced signal is distributed in the specific wavelength channel associated with the branching port 212b1, 212b2 . . . or 212bN at which the downstream broad-spectrum signal is received. In other words, the spectrum of the downstream spectrum-sliced signal output at the common port 212c is determined by the wavelength channel associated with the branching port 212b1, 212b2 . . . or 212bN at which the input downstream broad-spectrum signal is received.

The wavelength filter 212 can also process optical signals in the reverse direction. An upstream spectrum-sliced signal (received from the wavelength filter 222 via the feeder fiber 218 and the bidirectional amplifier 216) can be received at the common port 212c. The upstream spectrum-sliced signal is characterized by a spectrum in a specific wavelength channel "Ch1" or "Ch2" . . . "Ch N". The wavelength filter 212 can route the upstream spectrum-sliced signal to one of the branching ports 212b1, 212b2 . . . or 212bN in accordance with the wavelength channel of the upstream spectrum-sliced signal. The routing is so arranged that the wavelength channel of the upstream spectrum-sliced signal matches the wavelength channel of the receiving branching port 212b1, 212b2 . . . or 212bN. The upstream spectrum-sliced signal routed to a branching port 212b1, 212b2 . . . or 212bN is subsequently transmitted to one of the transceiver ports 209-1, 209-2 . . . or 209-N.

The central wavelength of an AWG can be sensitive to temperature variations. In one implementation, the wavelength filters 212 or 222 can be based on athermal AWGs, which become commercially available recently. The athermal AWGs have various temperature compensation mechanisms and allow the AWG-based wavelength filters 212 and 222 to be insensitive to temperature variations and to be installed in an environment without temperature control. This capability of the disclosed optical communication system can significantly reduce the complexity and cost for field installations.

The optical communication system 200 further includes a plurality of transceiver ports 209-1, 209-2 . . . and 209-N that can reside in the OLT 202. Each transceiver port 209-1, 209-2, . . . 209-N can include a transmitter 208-1 (or 208-2 . . . 208-N) for providing broad-spectrum downstream optical signals and a receiver 210-1 (or 210-2 . . . 210-N) for receiving upstream optical signals. Each transceiver port 209-1, 209-2, . . . 209-N is connected with one of the branching ports 212b1, 212b2 . . . 212bN of the wavelength filter 212 and is thus associated with a specific wavelength channel "Ch1", "Ch2" . . . "Ch N" of the wavelength filter 212. The wavelength filter 212 can be coupled with the transceiver ports 209-1, 209-2, . . . 209-N by single-mode optical fibers. The broad-spectrum signals produced by the transmitters 208-1, 208-2, . . . 208-N are sliced by the wavelength filter 212 to produce multiplexed spectrum-sliced signals each occupying a wavelength channel specific to the respective branching port 212b1, 212b2 . . . or 212bN of filter 212. The receivers 210-1, 210-2, . . . and 210-N are configured to receive spectrum-sliced signals having their wavelength channels specific to the respective branching ports 212b1, 212b2 . . . and 212bN of the wavelength filter 212.

In the present specification, the term "downstream signal" refers to an optical signal sent from service provider's central office to users' premises. The term "upstream signal" refers to an optical signal sent from the users' premises to a central office. The term "broad spectrum" refers to an optical signal that has a spectral full-width at half the maximum (FWHM) equal to or greater than 1 nanometer. A "narrow spectrum" refers to an optical signal that has a spectral FWHM less than a nanometer. A spectrum-sliced signal is sliced (or filtered) from a "broad-spectrum" signal. Thus the spectral FWHM of a spectrum-sliced signal is a fraction of the spectral FWHM of the source "broad-spectrum" signal.

The transmitters 208-1, 208-2, . . . and 208-N are broad-spectrum transmitters that can be directly modulated to carry the downstream optical signals. Examples for the broad-spectrum transmitters include light emitting diodes (LEDs), super luminescent diodes (SLDs), multi-longitudinal mode Fabry-Perot lasers, or other amplified spontaneous emission (ASE) sources. The transmitters 208-1, 208-2 . . . and 208-N can be modulated at rates ranging from hundreds to thousands of megabit per second (Mbps) modulation speed. The transmitters 208-1 . . . 208-N can provide stable broad-spectrum light sources (BSS) with minimal or no instabilities caused by external optical feedback or back-reflection. The center wavelengths (CW) of the common broad-spectrum signals can be anywhere in the optical spectrum of the communication window for the common optical fibers, which can include wavelengths at about 1310 nm, 1490 nm, 1550 nm, and 1600 nm.

The wavelength filter 212 can receive the broad-spectrum optical signals produced by the transmitter 208-1 . . . 208-N and filter (or slice) the broad-spectrum optical signals to produce multiplexed spectrum-sliced optical signals at the common port 212c. The spectrum of each spectrum-sliced optical signal is specifically associated with the branching port 212b1, 212b2 . . . or 212bN of the wavelength filter Ch1 . . . ChN at which the broad-spectrum signal is received.

The wavelength filters 212 and 222 based on AWGs can be cyclic over a wavelength range. The pass band for a spectrum-slicing channel (Ch1, Ch2 . . . and ChN) can be cyclic in the optical spectrum. Each channel (Ch1, Ch2 . . . ) can have multiple pass-band peaks separated by a free spectral range (FSR). The periodicity or free spectral range can be varied by design. The FSR in the filters 212 or 222 can be customized so that the spectral FWHM of the broad-spectrum source covers one or multiple spans of FSR's. Furthermore, the FSR may be designed to be close to the overall AWG pass band width (defined by the wavelength span between the center wavelengths of the first and the last filter channel within the same FSR: $|\lambda_{ChN}-\lambda_{Ch1}|$).

One advantage of the AWG based filters 212 or 222 is that the downstream and upstream traffics can be separated by a wavelength spacing of one or more FSRs for each channel ("Ch1", "Ch2" . . . or "Ch N"). For example, a bidirectional system can be implemented such that the downstream signals occupy a sequence of center wavelengths: $\lambda_{Ch1}, \lambda_{Ch2} \ldots \lambda_{ChN}$ in C band while upstream signals occupy a sequence of center wavelengths: $(\lambda_{Ch1}+n\times FSR)$, $(\lambda_{Ch2}+n\times FSR)$ ... $(\lambda_{ChN}+n\times FSR)$, where n=0 or +/−1 or +/−2 ... which denote usually different bands.

Each transceiver port 209-1 ... 209-N can include a signal separating/combining device 214-1 ... 214-N to assist bi-directional communications in either downstream or upstream directions. These signal separating/combining devices 214-1 ... 214-N can be implemented by WDM filters, power splitter, and circulators. The signal separating/combining devices 214-1 ... 214-N are respectively coupled with the transmitters 208-1 ... 208-N and the receivers 210-1 ... 210-N in the respective transceiver ports 209-1 ... 209-N. The signal separating/combining devices 214-1 ... 214-N are also coupled with the wavelength filter 212 through optical fiber connections. In the implementation of AWG for filter 212, the signal separating/combining devices 214-1 ... 214-N can use filter function to separate signal in different regions of the FSR for the downstream optical signals from the transmitter 208-1 ... 208-N and the upstream optical signals to be received by the receivers 210-1 ... 210-N. Thus the signal separating/combining devices 214-1 ... 214-N can enable bi-directional transmission of optical signals with single optical connections with the wavelength filter 212.

The wavelength filter 222, typically mirroring that of the filter 212 in optical specifications, is optically connected with the plurality of ONUs 206-1 ... 206-N. Each of the ONUs 206-1 ... 206-N is specifically associated with a counterpart transceiver port 209-1 ... 209-N in the OLT 202 and is characterized by a specific wavelength channel determined by the filter function of the filters 212 and 222. Each wavelength channel can carry bidirectional signals.

A detailed view of the wavelength filter 222 in the RN 204 is shown in FIG. 2C. The wavelength filter 222 includes a plurality of branching ports 222b1, 222b2 ... and 222bN, and a common port 222c. Each of the branching ports 222b1, 222b2 ... and 222bN is associated with a distinct and specific wavelength channel "Ch1", "Ch2" ... or "Ch N". Each branching port 222b1, 222b2 ... or 222bN is respectively connected with an ONU 206-1, 206-2 ... or 206-N. The wavelength filter 222 can receive an upstream broad-spectrum signal at a branching ports 222b1, 222b2 ... or 222bN from an ONU 206-1 ... 206-N, and filter (or slice) the spectrum of the upstream broad-spectrum signal. The wavelength filter 222 then outputs an upstream spectrum-sliced signal at the common port 222c (to be sent to the bidirectional amplifier 216 via feeder fiber 218). The spectrum of the upstream spectrum-sliced signal is distributed in the specific wavelength channel associated with the branching port 222b1, 222b2 ... or 222bN at which the upstream broad-spectrum signal is received. In other words, the spectrum of the upstream spectrum-sliced signal output at the common port 222c is determined by the wavelength channel associated with the branching port 222b1, 222b2 ... or 222bN at which the input upstream broad-spectrum signal is received.

Each ONU 206-1 ... 206-N can include a transmitter 228-1 (or 228-2, 228-N) for providing a broad-spectrum upstream optical signals and a receiver 220-1 (or 220-2, 220-N) for receiving downstream optical signals. Each ONU 206-1, 206-2 ... 206-N is connected with a branching port 222b1, 222b2 ... 222bN of the wavelength filter 222 and is associated with a specific wavelength channel "Ch1", "Ch2" ... "Ch N" of the wavelength filter 222. The wavelength filter 222 can be coupled with the ONUs 206-1 ... 206-N by single-mode optical fibers. The broad-spectrum signals produced by the transmitters 228-1 ... 228-N are sliced by the wavelength filter 222 to produce multiplexed upstream signals with specific wavelength channels determined by the branching ports 222b1, 222b2 ... and 222bN of the wavelength filter 222.

The wavelength filter 222 can receive amplified downstream spectrum-sliced signal from the bidirectional amplifier 216 via the feeder fiber 218 at the common port 222c. The downstream spectrum-sliced signal is characterized by a wavelength channel of one of the branching ports 212b1, 212b2 ... and 212bN of the wavelength filter 212. The wavelength filter 222 can route the downstream spectrum-sliced signal to one of the branching ports 222b1, 222b2 ... or 222bN in accordance with the wavelength channel of the downstream spectrum-sliced signal such that the wavelength channel of the downstream spectrum-sliced signal matches the wavelength channel of the receiving branching port 222b1, 222b2 ... or 222bN. The downstream spectrum-sliced signal routed to a branching port 222b1, 222b2 ... or 222bN is subsequently transmitted to one of the ONUs 206-1 ... 206-N.

The receivers 220-1 ... 220-N in the ONUs 206-1 ... 206-N are configured to receive downstream signals that are transmitted through the specific filter channel. As an example, the ONU 206-1 and the OLT 209-1 share the same wavelength channel "Ch1". The ONU 206-2 and the transceiver port 209-2 share the same wavelength channel "Ch2", and so on. Each ONU 206-1 ... 206-N includes a signal separating/combining device 224-1 (or 224-2 ... 224-N), a transmitter 228-1 (or 228-2 ... 228-N), and a receiver 220-1 (or 220-2 ... 220-N). The transmitters 228-1 ... 228-N are also broad-spectrum sources, but their implementations are not necessarily identical to the transmitter 208-1 ... 208-N.

It should be noted that although an ONU 206-1 ... 206-N and its counterpart transceiver port 209-1 ... 209-N in the OLT 202 share the communication tasks in each channel "Ch1", "Ch2" ... or "ChN", they do not have to operate in the same wavelength range for both downstream and upstream transmission. For example, utilizing the cyclic features in the case of AWGs as the wavelength filters 212 and 222, the downstream and upstream signals can occupy different wavelengths, which are separated by a multiple of FSRs.

The transmitter 228-1 ... 228-N can produce broad-spectrum upstream signals to be sent to the common port 222c at the wavelength filter 222 wherein the broad-spectrum upstream signals are sliced (or filtered) into specific wavelength channels. For example, the broad-spectrum upstream signal from the ONU 206-1 is filtered by the wavelength filter 222 to produce a spectrum-sliced upstream signal in the wavelength channel "Ch 1" that is also specific to the transceiver port 209-1. The spectrum-sliced upstream signal is amplified if necessary, passing through the wavelength filter 212 and the signal separating/combining device 214-1, and being received by the receiver 210-1 in the transceiver port 209-1.

In the downstream direction, the broad-spectrum optical signal produced by the transmitter 208-1 passes the signal separating/combining device 214-1 and is sliced (or filtered) by the wavelength filter 212 into a spectrum-sliced downstream signal in the wavelength channel "Ch 1". The spectrum-sliced downstream signal is next amplified if necessary and transmitted to the wavelength filter 222 at the RN 204. The wavelength filter 222 then routes the spectrum-sliced downstream signal in "Ch 1" to the ONU 206-1 that is characterized by the same wavelength channel "Ch 1". As described, each of the ONUs communicates downstream or upstream in its specific wavelength channel within each system. The secure wavelength specific communications in the disclosed system is a significant improvement over the broadcasting mode of communications in some conventional systems.

A key feature of the optical communication system 200 is the use of stable, broad-spectrum sources for the transmitter 208-1 . . . 208-N, and the transmitter 228-1 . . . 228-N in comparison with the wavelength-specific narrow-spectrum transmitters used in the convention optical systems (e.g. the conventional WDM-based optical network 100). The wavelength-specific narrow-spectrum transmitters in the convention optical systems are usually provided by wavelength-controlled light sources such as a DFB laser.

Figure 5:
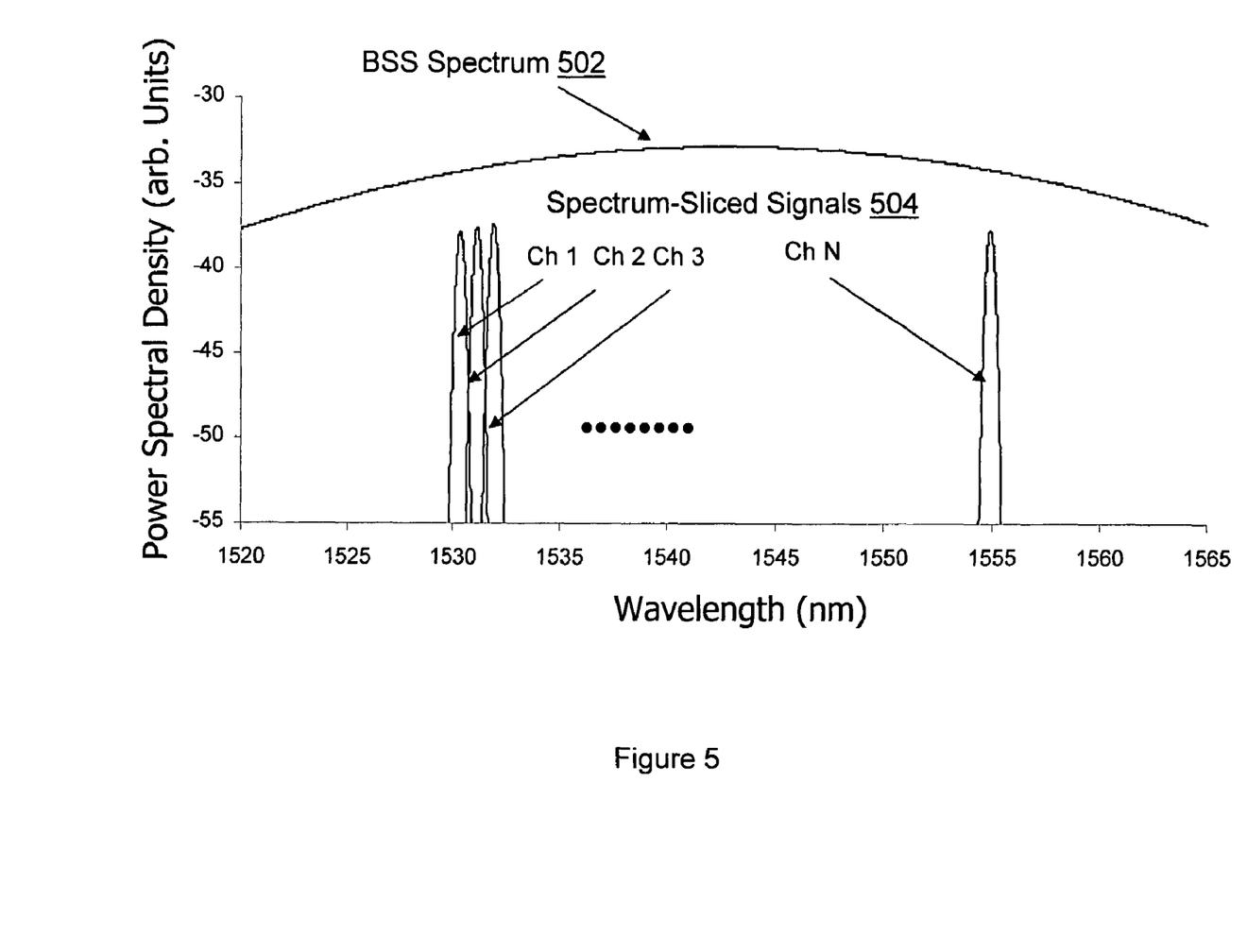
FIG. 5 illustrates the spectra of the spectrum-sliced signals relative to the emission spectrum of a typical broad-spectrum source in the disclosed optical communication system.

An advantage of the use of BSS in the optical communication system 200 is that the transmitter 208-1 . . . 208-N and the transmitter 228-1 . . . 228-N can be self-adaptive in signal transmission and do not need costly temperature control to stabilize the center wavelength of the emission spectrum. As shown in FIG. 5, the spectra of the spectrum-sliced signals are only narrow slices of the spectrum of a broad-spectrum source. The transmitter 208-1 . . . 208-N and the transmitter 228-1 . . . 228-N has a broad spectrum that can typically cover all the wavelength channels of filters 212 and 222 or typically cover all the channels in a given FSR range in the case of AWGs as filters for 212 and 222. Thus, the BSS, after the spectrum slicing, can provide input signal source for any of the wavelength channels, even if the BSS spectrum shifts somewhat due to temperature variations. The single transmitter that can provide light source for a plurality of channels can also be referred to as colorless or self-adaptive light source. Furthermore, the broad spectra also allow the transmitters 208-1 . . . 208-N at the OLT 202 or the transmitters 228-1 . . . 228-N at the ONUs 206-1 . . . 206-N to use identical transmitters.

Figure 4:
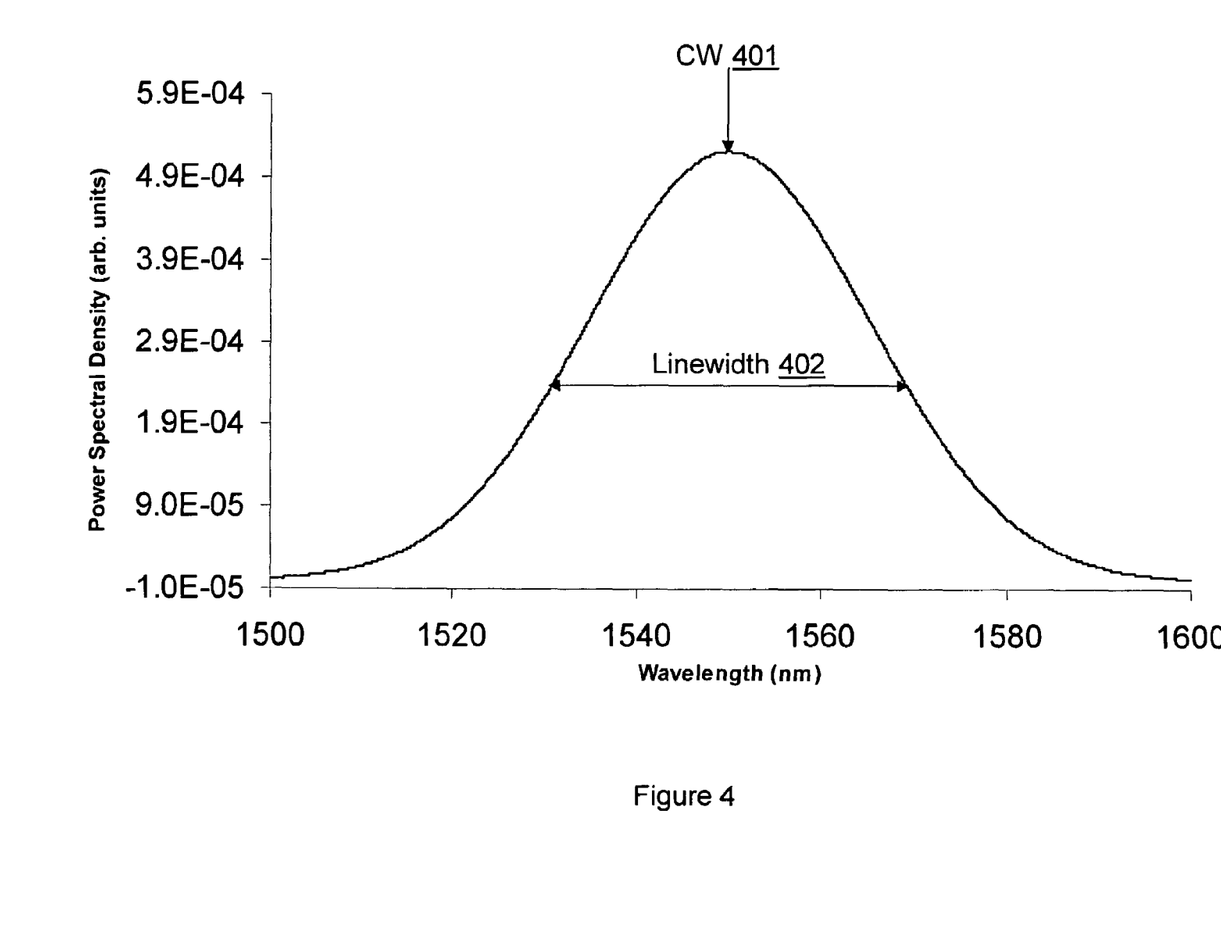
FIG. 4 illustrates the emission spectrum of a typical broad-spectrum source.

An exemplified emission spectrum of a typical broad-spectrum source (BSS) suitable for the transmitters 208-1 . . . 208-N and 228-1 . . . 228-N is shown in FIG. 4. The emission spectrum is characterized by the peak shape, the center wavelength (CW) 401, and the spectral linewidth 402. The spectral linewidth can commonly be represented by the peak full width at half the maximum (FWHM).

FIG. 5 illustrates the spectrum-sliced signal 504 produced by the wavelength filters 212 and 222 relative to the broad-spectrum signal 502 produced by the transmitters 208-1 . . . 208-N and/or 228-1 . . . 228-N. The spectrum-sliced signals of "Ch1", "Ch2", "Ch3" . . . and "Ch N" can be separated by a fixed wavelength or frequency spacing. The extra-wide spectral profile of BSS is designed to accommodate CW shifts induced by temperature variations in an outdoor uncontrolled environment. The design characteristics of the high inter-channel optical isolation of the filters warrants that a large number of spectrum-sliced signals can be contained in the BSS Spectrum 502 without significant interference of spectrum-sliced signals from other channels.

While the BSS in the optical communication system 200 provides an economic solution for the high-speed accesses in the last mile of the network infrastructure, BSS can also suffer the drawback of high slicing loss. The slicing loss is usually quiet high and can be as high as 30+dB depending on the spectral FWHM of the BSS and the band pass profile of the wavelength filter.

The optical communication system 200 overcomes the slicing loss by amplifying the downstream signals and/or the upstream signals after spectrum slicing. The optical communication system 200 includes a bidirectional amplifier 216 in the OLT 202. The bidirectional amplifier 216 is optically coupled with the wavelength filter 212 in the OLT 202, and with the wavelength filter 222 through a common feeder fiber 218. The amplifier 216 can be energized by an external shared pump source 226 among multiple system 200. Since an active pump source is not required locally within the OLT 202, the amplifier can be referred to as a "passive amplifier" or "passive amplet."

Both downstream and upstream optical signals can be amplified by the bidirectional passive amplifier 216. For downstream communication, the transmitters 208-1 . . . 208-N provide input of downstream optical signals to the wavelength filter 212. The output of the wavelength filter 212 is multiple spectrum-sliced signals each corresponding to the specific wavelength channel of the filter 212. The multiplexed downstream spectrum-sliced signals output from the common port 212c are amplified by the bidirectional amplifier 216 and transmitted down the feeder fiber 218. For upstream communication, the upstream spectrum-sliced signals from the wavelength filter 222 at the RN 204 travel over the feeder fiber 218 (e.g., 20 km long) before they are amplified by the bidirectional amplifier 216.

Figure 3:
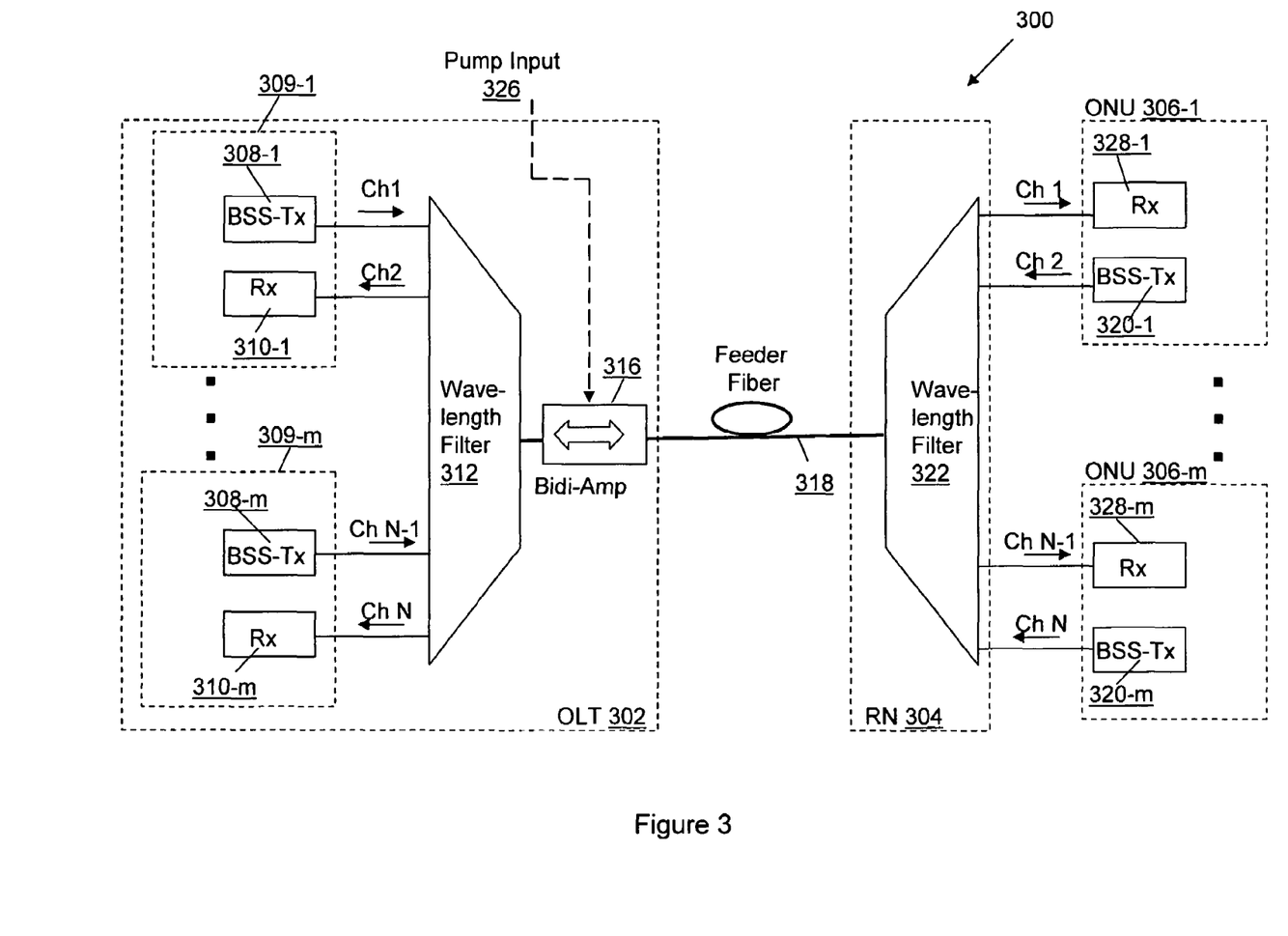
FIG. 3 is a block diagram of an optical communication system in accordance to another embodiment of the present specification.

Another embodiment of the present specification is shown in FIG. 3. An optical communication system 300 is similar to the optical communication system 200 except for that the signal separating/combining devices in the OLT and ONUs (corresponding to 214-1 . . . 214-N and 224-1 . . . 224-N in FIG. 2A) are eliminated. The transmitters 308-1 . . . 308-m and the receivers 310-1 . . . 310-m in the transceiver ports 309-1 . . . 309-m are directly coupled to the separate optical wavelength channels of the wavelength filter 312. Each connection from the transmitters 308-1 . . . 308-m to the wavelength filter 312 only carries downstream broad-spectrum signals for spectrum slicing. The connections between the wavelength filter 312 and the receivers 310-1 . . . 310-m only receive amplified upstream spectrum-sliced signals routed by the wavelength filter 312 to the corresponding wavelength channels.

Similarly, the transmitters 328-1 . . . 328-m and the receivers 320-1 . . . 320-m in the ONUs 306-1 . . . 306-m are directly connected to the separate wavelength channels of the wavelength filter 322. The wavelength filter 322 receives broad-spectrum upstream signals exclusively from the transmitters 328-1 . . . 328-m and produces multiple spectrum-sliced signals multiplexed into the feeder fiber 318. The signals are further amplified by the bi-directional amplifier and then routed by filter 312 based on the wavelength channels to the respective receiver ports 310-1 . . . 310-m. The wavelength filter 322 routes downstream spectrum-sliced signals, typically amplified by the bidirectional amplifier 316, to the respective channels and further to the receivers 320-1 . . . 320-m for signal detection.

Figure 6:
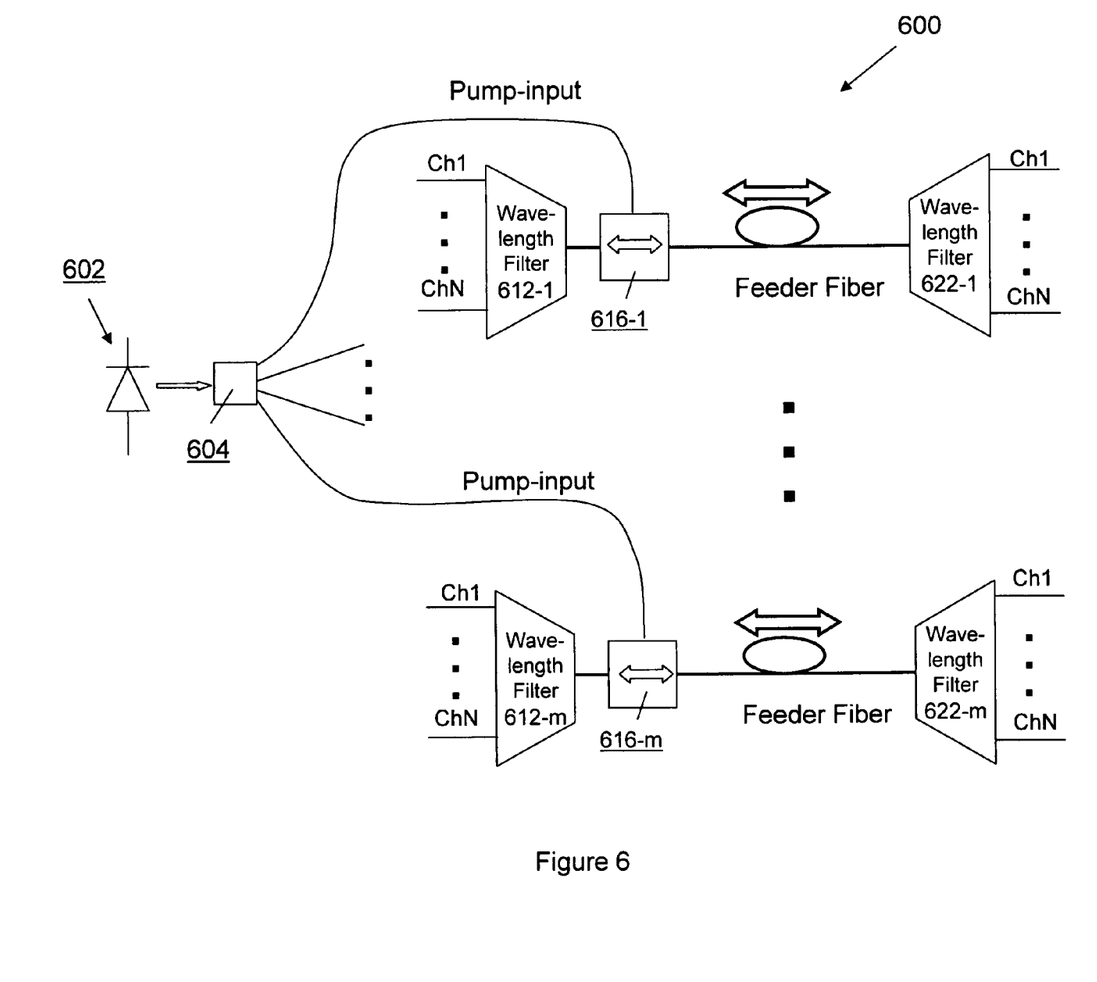
FIG. 6 is a block diagram of an optical communication system in accordance to an embodiment of the present specification wherein passive amplifiers at different optical line terminals share a single pump laser.

In another embodiment, referring now to FIG. 6, an optical communication system 600 includes a plurality pairs of wavelength filters 612-1 and 622-1 . . . and 612-m and 622-m. Each of the wavelength filters 612-1 and 622-1 . . . 612-m and 622-m is configured to receive broad-spectrum signals and to produce multiple spectrum-sliced signals based on the specific wavelength channels of the filter pairs 612x and 622x: "Ch 1", "Ch 2" . . . and "Ch N". Each pair of the wavelength filters 612-1 and 622-1 . . . or 612-m and 622-m are typically mirroring in optical specifications and are coupled with a passive bi-directional amplifier 616-1 . . . 616-m. The wavelength filters 612-1 . . . 612-m and their associated passive bi-directional amplifiers 616-1 . . . 616-m can reside at the same or different locations. The passive bi-directional amplifiers 616-1 . . . 616-m are energized by a common pump laser 602 to overcome the loss in signal strength during the propagation over distance through the fiber or during filter slicing and routing. A splitter 604 can distribute the pump laser output to each of the passive bi-directional amplifiers 616-1 ... 616-m. The use of a shared external pump laser 602 for a plurality of passive bi-directional amplifiers 616-1616-m can significantly lower the system costs of the disclosed optical communication system. In addition, more than one pump lasers can be implemented as pump sources 602 to improve system reliability through redundancy protection.

Figure 7:
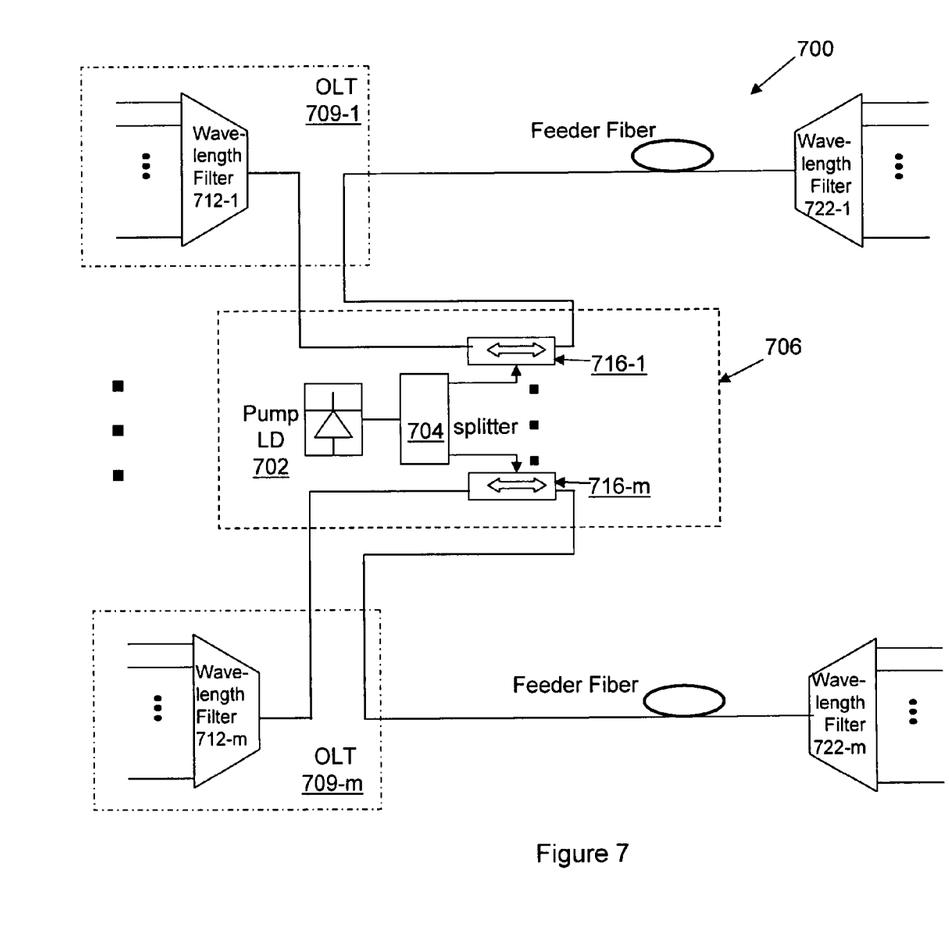
FIG. 7 is a block diagram of an optical communication system having a centralized optical amplifying unit in accordance to an embodiment of the present specification.

In another embodiment, referring now to FIG. 7, an optical communication system 700 includes a plurality pairs of wavelength filters 712-1 and 722-1 ... and 712-m and 722-m. Similar to the optical systems 200 and 300, each of the wavelength filters 712-1 and 722-1 ... 712-m and 722-m is configured to receive broad-spectrum signals to produce multiplexed spectrum-sliced signals based on the specific wavelength channels of the filter pairs 712x and 722x. The wavelength filters 712-1 and 722-1 ... 712-m and 712-m are bi-directional: they can also route spectrum-sliced signals to a plurality of receivers.

The optical communication system 700 includes a centralized signal amplifying unit 706 that handles the amplification among a plurality of subsystem. The centralized signal amplifying unit 706 can include a plurality of passive bi-directional amplifiers 716-1 ... 716-m that are each coupled with one pair of the wavelength filters 712-1 and 722-1 ... or 712-m and 722-m. The OLT 709-1 ... 709-m and the centralized signal amplifying unit 706 can reside at the same or different locations. The passive bi-directional amplifiers 716-1 ... 716-m can overcome the slicing loss when the downstream broad-spectrum signals are filtered into the spectrum-sliced optical signals by the wavelength filters 712-1 ... 712-m. The passive bi-directional amplifiers 716-1 ... 716-m can also overcome the propagation loss when the upstream spectrum-sliced signals from the wavelength filters 712-1 ... 712-m travel over distance through the fiber networks. The passive bi-directional amplifiers 716-1 ... 716-m can be energized by a common pump source 702 in the centralized signal amplifying unit 706. A splitter 708 can distribute power from the common pump source 702 to the passive bi-directional amplifiers 716-1 ... 716-m. Pump source redundancy can be implemented for better system reliability. Each OLT 709-1 ... 709-m in the optical communication system 700 does not require a local built-in bidirectional amplifier.

The optical communication system 700 allows further integration of the passive bi-directional amplifiers 716-1 ... 716-m and the shared pump source 702, which reduces cost and simplifies maintenance. In one implementation, the centralized signal amplifying unit 706 can locate at a central location such as a central office. In another implementation, the centralized signal amplifying unit 706 can be contained in chassis-based equipment with multiple PON line cards that can be mounted to a rack in a central office. In yet another implementation, one or more bi-directional amplifiers 716-1 ... 716-m, one or more pump sources 702, one or more pump power splitters, and one or more pump power couplers can be integrated on one or more planar lightwave circuits.

It is understood that the disclosed systems and methods are compatible with other configurations of the filter, the optical transmitter, the optical receiver, and amplifiers. For example, the filter is not limited to the example of AWG described above. Other examples of the filter include thin-film based optical filters. The amplifiers can take various forms, such as EDFA, SOA or the combination of SOA and EDFA for downstream and upstream signals. The configuration of various communication devices in the disclosed system can also vary from what is described and depicted above. Wavelengths and bandwidths different from the examples described above can also be used in the broad-spectrum or the narrow-spectrum signals without deviating from the spirit of the specification. Furthermore, the bidirectional amplifier disclosed above can be applied to a TDM optical network and a hybrid TDM/WDM optical network.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

What is claimed is:

1. An optical communication system, comprising:
   a) a first wavelength filter, comprising:
      a plurality of first branching ports each associated with a specific wavelength channel, wherein each of the first branching ports is in connection with a transceiver port and is configured to receive a downstream broad-spectrum signal from the transceiver port; and
      a first common port configured to output a downstream spectrum-sliced signal in response to the downstream broad-spectrum signal, wherein the spectrum of the downstream spectrum-sliced signal is a portion of the spectrum of the downstream broad-spectrum signal and the spectrum of the downstream spectrum-sliced signal is distributed in a wavelength channel specifically associated with the first branching port at which the downstream broad-spectrum signal is received;
   b) a bidirectional amplifier configured to receive the downstream spectrum-sliced signal from the first common port and to send an amplified downstream spectrum-sliced signal to a remote node, wherein the bidirectional amplifier is configured to receive an upstream spectrum-sliced signal from the remote node and to send an amplified upstream spectrum-sliced signal to the first common port of the first wavelength filter, and wherein the first wavelength filter is configured to route the amplified upstream spectrum-sliced signal to one of the first branching ports in accordance with the wavelength channel of the amplified upstream spectrum-sliced signal; and
   c) a plurality of transceiver ports each comprising:
      a first transmitter configured to produce the downstream broad-spectrum signal to be received by the first branching port in connection with the transceiver port, wherein the downstream broad-spectrum signal has a spectral full-width at half the maximum broader than the spectral range of the downstream spectrum-sliced signals in three adjacent wavelength channels each associated with one of the plurality of first branching ports; and
      a first receiver configured to receive the amplified upstream spectrum-sliced signal from the first branching port.

2. The optical communication system of claim 1, wherein at least one of the transceiver ports comprises:
   a first signal separating/combining device configured to receive the downstream broad-spectrum signal from the first transmitter and to send the downstream broad-spectrum signal to the associated branching port in the first wavelength filter, and configured to receive the amplified upstream spectrum-sliced signal from the associated branching port in the wavelength filter and to send the amplified upstream spectrum-sliced signal to the first receiver.

3. The optical communication system of claim 1, wherein the spectral full-width at half the maximum of the downstream broad-spectrum signal is broader than 1 nanometer.

4. The optical communication system of claim 1, wherein the first wavelength filter comprises an arrayed-waveguide grating configured to filter the downstream broad-spectrum signal received at one of the first branching ports and to pass the downstream spectrum-sliced signal to the first common port.

5. The optical communication system of claim 1, wherein the first wavelength filter is configured to route the amplified upstream spectrum-sliced signal received at the first common port to one of the first branching ports such that the wavelength channel of the amplified upstream spectrum-sliced signal matches the specific wavelength channel associated with the first branching port that receives the amplified upstream spectrum-sliced signal.

6. The optical communications system of claim 1, wherein the bidirectional amplifier comprises only passive components and is energized by an external pump source.

7. The optical communication system of claim 1, wherein the first wavelength filter and the bidirectional amplifier are co-located at an optical line terminal.

8. The optical communication system of claim 1, wherein the remote node comprises a second wavelength filter that comprises:
a plurality of second branching ports each associated with a specific wavelength channel, wherein each of the second branching ports is configured to receive an upstream broad-spectrum signal from an optical network unit; and
a second common port configured to output the upstream spectrum-sliced signal in response to the upstream broad-spectrum signal, wherein the spectrum of the upstream spectrum-sliced signal is a portion of the spectrum of the upstream broad-spectrum signal and the spectrum of the upstream spectrum-sliced signal is distributed in a wavelength channel specifically associated with the second branching port at which the upstream broad-spectrum signal is received.

9. The optical communication system of claim 8, wherein the second wavelength filter is configured to receive the amplified downstream spectrum-sliced signal from the bidirectional amplifier at the second common port and to route the amplified downstream spectrum-sliced signal to the optical network unit that is specifically associated with the wavelength channel of the downstream spectrum-sliced signal.

10. The optical communication system of claim 8, wherein the optical network unit comprises a second receiver configured to receive the amplified downstream spectrum-sliced signal from the second common port and a second transmitter configured to produce the upstream broad-spectrum signal to be sent to the second branching port in connection with the optical network unit.

11. The optical communication system of claim 8, wherein the spectral full-width at half the maximum of the upstream broad-spectrum signal is broader than 1 nanometer.

12. An optical communication system, comprising:
a) a first wavelength filter, comprising:
a plurality of first branching ports each associated with a specific wavelength channel, wherein each of the first branching ports is configured to receive a downstream broad-spectrum signal; and
a first common port configured to output a downstream spectrum-sliced signal in response to the downstream broad-spectrum signal, wherein the spectrum of the downstream spectrum-sliced signal is a portion of the spectrum of the downstream broad-spectrum signal and the spectrum of the downstream spectrum-sliced signal is distributed in a wavelength channel specifically associated with the first branching port at which the downstream broad-spectrum signal is received;
b) a bidirectional amplifier configured to receive the downstream spectrum-sliced signal from the first common port and to send an amplified downstream spectrum-sliced signal to a second wavelength filter, wherein the bidirectional amplifier is configured to receive an upstream spectrum-sliced signal from the second wavelength filter and to send an amplified upstream spectrum-sliced signal to the first common port, and wherein the first wavelength filter is configured to route the amplified upstream spectrum-sliced signal to one of the first branching ports in accordance with the wavelength channel of the amplified upstream spectrum-sliced signal; and
c) a second wavelength filter, comprising:
a plurality of second branching ports each associated with a specific wavelength channel, wherein each of the second branching ports is configured to receive an upstream broad-spectrum signal;
a second common port configured to output the upstream spectrum-sliced signal in response to the upstream broad-spectrum signal, wherein the spectrum of the upstream spectrum-sliced signal is a portion of the spectrum of the upstream broad-spectrum signal and the spectrum of the upstream spectrum-sliced signal is distributed in a wavelength channel specifically associated with the second branching port at which the upstream broad-spectrum signal is received, and wherein the second wavelength filter is configured to receive the amplified downstream spectrum-sliced signal from the bidirectional amplifier at the second common port and to route the amplified downstream spectrum-sliced signal to one of the second branching ports that is specifically associated with the wavelength channel of the downstream spectrum-sliced signal; and
d) a plurality of transceiver ports each in connection with one of the first branching ports and comprising a first transmitter configured to produce the downstream broad-spectrum signal to be received by the first branching port in connection with the transceiver port, wherein the downstream broad-spectrum signal has a spectral full-width at half the maximum broader than the spectral range of the downstream spectrum-sliced signals in three adjacent wavelength channels each associated with one of the plurality of first branching ports.

13. The optical communication system of claim 12, wherein at least one of the plurality of transceiver ports comprises
a first receiver configured to receive the amplified upstream spectrum-sliced signal from the first branching port in connection with the transceiver port.

14. The optical communication system of claim 12, further comprising a plurality of optical network units each in connection with one of the second branching ports and comprising:
a second receiver configured to receive the amplified downstream spectrum-sliced signal from the second branching port in connection with the optical network unit; and
a second transmitter configured to produce the upstream broad-spectrum signal to be sent to the second branching port in connection with the optical network unit.

15. The optical communication system of claim 12, wherein the first wavelength filter comprises an arrayed-waveguide grating configured to filter the downstream broad-spectrum signal received at one of the first branching ports and to pass the downstream spectrum-sliced signal to the first common port.

16. The optical communication system of claim 12, wherein the second wavelength filter comprises an arrayed-waveguide grating configured to filter the upstream broad-spectrum signal received at one of the second branching ports and to pass the upstream spectrum-sliced signal to the second common port.

17. The optical communication system of claim 12, wherein the first wavelength filter is configured to route the amplified upstream spectrum-sliced signal received at the first common port to one of the first branching ports such that the wavelength channel of the amplified upstream spectrum-sliced signal matches the specific wavelength channel associated with the branching port.

18. The optical communication system of claim 12, wherein the second wavelength filter is configured to route the amplified downstream spectrum-sliced signal received at the second common port to one of the second branching ports such that the wavelength channel of the amplified downstream spectrum-sliced signal matches the specific wavelength channel associated with the second branching port.

19. The optical communications system of claim 12, wherein the bidirectional amplifier comprises only passive components and is energized by an external pump source.

20. The optical communication system of claim 12, wherein the spectral full-width at half the maximum of the downstream broad-spectrum signal is broader than 1 nanometer.

21. The optical communication system of claim 12, wherein the spectral full-width at half the maximum of the upstream broad-spectrum signal is broader than 1 nanometer.

22. An optical communication system, comprising:
a) a plurality of first wavelength filters, each comprising:
a plurality of first branching ports each associated with a specific wavelength channel, wherein each of the first branching ports is configured to receive a downstream broad-spectrum signal; and
a first common port configured to output a downstream spectrum-sliced signal in response to the downstream broad-spectrum signal, wherein the spectrum of the downstream spectrum-sliced signal is a portion of the spectrum of the downstream broad-spectrum signal and the spectrum of the downstream spectrum-sliced signal is distributed in a wavelength channel specifically associated with the first branching port at which the downstream broad-spectrum signal is received;
b) a plurality of bidirectional amplifiers in connect with one of the first wavelength filters and one of the second wavelength filters, wherein each of bidirectional amplifier is configured to receive the downstream spectrum-sliced signal from the first common port and to send an amplified downstream spectrum-sliced signal to a second wavelength filter, wherein the bidirectional amplifier is configured to receive an upstream spectrum-sliced signal from the second wavelength filter and to send an amplified upstream spectrum-sliced signal to the first common port, and wherein the first wavelength filter is configured to route the amplified upstream spectrum-sliced signal to one of the first branching ports in accordance with the wavelength channel of the amplified upstream spectrum-sliced signal;
c) a single pump source configured to energize the plurality of bidirectional amplifiers; and
d) a plurality of second wavelength filters, each comprising:
a plurality of second branching ports each associated with a specific wavelength channel, wherein each of the second branching ports is configured to receive an upstream broad-spectrum signal; and
a second common port configured to output the upstream spectrum-sliced signal in response to the upstream broad-spectrum signal, wherein the spectrum of the upstream spectrum-sliced signal is a portion of the spectrum of the upstream broad-spectrum signal and the spectrum of the upstream spectrum-sliced signal is distributed in a wavelength channel specifically associated with the second branching port at which the upstream broad-spectrum signal is received, and wherein the second wavelength filter is configured to receive the amplified downstream spectrum-sliced signal from the bidirectional amplifier at the second common port and to route the amplified downstream spectrum-sliced signal to one of the second branching ports that is specifically associated with the wavelength channel of the downstream spectrum-sliced signal.

23. The optical communication system of claim 22, wherein the pump source and the plurality of bidirectional amplifiers are located in a common location.

24. The optical communication system of claim 23, wherein two or more of the plurality of bidirectional amplifiers and the pump source can be integrated on a planar lightwave circuit.

25. The optical communication system of claim 22, further comprising:
a splitter coupled with the pump source and the plurality of bidirectional amplifiers, wherein the splitter is configured to distribute power from the pump source to the plurality of bidirectional amplifier.

26. The optical communication system of claim 25, wherein the pump source, the splitter, and the plurality of bidirectional amplifiers are located in a common location or on a planar lightwave circuit.

* * * * *